(12) United States Patent
Bierl et al.

(10) Patent No.: US 8,291,752 B2
(45) Date of Patent: Oct. 23, 2012

(54) METHOD AND DEVICE FOR MONITORING AN EXHAUST-GAS TURBOCHARGER

(75) Inventors: Rudolf Bierl, Regensburg (DE); Martin Lesser, Landshut (DE); Andreas Meyer, Zell (DE); Frank Steuber, Korntal-Münchingen (DE)

(73) Assignee: Continental Automotive GmbH, Hannover (DE)

( * ) Notice: Subject to any disclaimer, the term of this patent is extended or adjusted under 35 U.S.C. 154(b) by 347 days.

(21) Appl. No.: 12/308,316

(22) PCT Filed: May 31, 2007

(86) PCT No.: PCT/EP2007/055325
§ 371 (c)(1),
(2), (4) Date: Apr. 10, 2009

(87) PCT Pub. No.: WO2007/144274
PCT Pub. Date: Dec. 21, 2007

(65) Prior Publication Data
US 2010/0000309 A1   Jan. 7, 2010

(30) Foreign Application Priority Data
Jun. 13, 2006 (DE) .................. 10 2006 027 422

(51) Int. Cl.
*G01M 15/02* (2006.01)

(52) U.S. Cl. .................................. 73/114.77

(58) Field of Classification Search ........... 73/114.69, 73/114.77
See application file for complete search history.

(56) References Cited

U.S. PATENT DOCUMENTS

| | | | |
|---|---|---|---|
| 3,861,211 A | 1/1975 | Dewan | |
| 5,635,646 A | 6/1997 | Eriksson | |
| 6,298,728 B1 | 10/2001 | Fekete et al. | |
| 6,378,306 B2 | 4/2002 | Koelle et al. | |
| 2001/0022084 A1 | 9/2001 | Koelle et al. | |
| 2005/0257520 A1 | 11/2005 | Fischle et al. | |
| 2006/0064231 A1 | 3/2006 | Fekete et al. | |
| 2010/0011868 A1* | 1/2010 | Cox | 73/660 |

FOREIGN PATENT DOCUMENTS

| | | |
|---|---|---|
| DE | 3605958 A1 | 9/1987 |
| DE | 41 04 179 A1 | 8/1992 |
| DE | 19708302 A1 | 9/1998 |
| DE | 69410782 T2 | 2/1999 |
| DE | 10012926 A1 | 10/2001 |
| DE | 10237416 A1 | 2/2004 |
| DE | 102004029857 A1 | 1/2006 |
| EP | 0 535 364 A1 | 4/1993 |
| EP | 0952454 A1 | 10/1999 |
| GB | 2359380 A | 8/2001 |
| JP | 55-009194 A | 1/1980 |
| JP | 8-326644 A | 12/1996 |
| JP | 2000045786 A | 2/2000 |
| JP | 2001248454 A | 9/2001 |
| JP | 2003097281 A | 4/2003 |
| JP | 2005538288 T | 12/2005 |
| JP | 2006-184036 A | 7/2006 |

* cited by examiner

*Primary Examiner* — Eric S McCall
(74) *Attorney, Agent, or Firm* — Cozen O'Connor

(57) ABSTRACT

The present invention relates to a method and a device for monitoring an exhaust-gas turbocharger of an internal combustion engine. In order to create an inexpensive and also reliably operating method and a corresponding device for monitoring an exhaust-gas turbocharger, it is proposed that a sound transducer which is designed to record rotational-speed dependent turbocharger operating noise is provided, which sound transducer is connected to an electronic system for frequency analysis for the output of a turbocharger rotational speed signal.

11 Claims, 2 Drawing Sheets

METHOD AND DEVICE FOR MONITORING AN EXHAUST-GAS TURBOCHARGER

PRIORITY CLAIM

This is a U.S. national stage of application No. PCT/EP2007/055325, filed on 31 May 2007, which claims Priority to the German Application No: 10 2006 027 422.9, Filed: 13 Jun. 2006; the contents of both which are incorporated here by reference.

BACKGROUND OF THE INVENTION

1. Field of the Invention

The present invention relates to a method and a device for monitoring an exhaust gas turbocharger of an internal combustion engine.

2. Description of the Prior Art

In internal combustion engines, it is known to cause an air/fuel mixture to burn by compressing it. The power output of the internal combustion depends on the ratio of the fuel mass flow rate to the air mass flow rate. The measurement of a respective air mass flow rate is carried out with an air mass flow rate sensor which is seated in the intake section of the internal combustion engine. Numerous modern internal combustion engines are equipped today with an exhaust-gas turbocharger which brings about precompression of the air mass flow. Although attempts at precompression of the air to be fed to an internal combustion engine with the objective of increasing the engine power by increasing the air mass flow rate and fuel flow rate per working stroke were carried out at the very start of the development of the internal combustion engines, nowadays the charging of spark-ignition internal combustion engines is no longer primarily considered from the point of view of power but rather as a possible way of saving fuel and reducing pollutants. In this context, energy for precompressing the air mass flow rate is extracted in a known fashion from a respective flow of exhaust gas by means of a turbine which runs in the flow of exhaust gas, with a fresh air compressor which is mechanically coupled to said turbine, with the result that, a diesel engine no longer operates as an induction engine but rather as a supercharged engine with charge air pressures of up to 1.5 or 2.5 bar with a clear power increase and reduced emissions of pollutants.

Using a turbocharger not only increases the torque of an internal combustion engine but also the thermal loading of the internal combustion engine, for which reason the engine block, cylinder heads, cylinder head seals, bearings, cylinders, connecting rods, valves, pistons and other engine components as well as the subsequent drive train have to be correspondingly configured for this additional loading. The higher power also requires a cooling system for cooling the engine and the charge air to be given correspondingly large dimensions. In this context, it is, however, frequently found in the case of supercharged spark-ignition engines that exhaust gas turbines even become red hot after journeys at a high load. Such strong thermal and mechanical stressing of a component which can reach rotational speeds of up to 200,000 revolutions per minute makes separate monitoring necessary. This is because when turbochargers are used in modern motor vehicles a considerable complexity of control is caused, as a result of which damage diagnosis is made more complicated. Modern completely electronic diagnosis systems have an existing function in this context by evaluating the rotational speed of a turbocharger in order to monitor its function. However, a specially developed sensor has to be provided to determine the rotational speed of a turbocharger. This sensor has to withstand extremely adverse conditions, that is to say, in particular, high temperatures and high pressures, and at the same time reliably detect the blades of the turbocharger wheel and calculate the rotational speed signal with an electronic system connected downstream. For this purpose, the sensor has to be mounted directly on the turbocharger.

Given all the advantages, it is known to be a disadvantage of a turbocharger that a turbocharger cannot generate a sufficient charge pressure for the fresh air in a starting up process/acceleration process as a transient operating state, with the result, that in the intake system an under pressure is briefly produced. When acceleration from low rotational speeds occurs, the correct quantity of exhaust gas to generate the desired charge pressure is initially not available. A sufficiently strong flow of exhaust gas to bring about supercharging to a necessary degree is not available until the rotational speed rises.

This lack of power at low rotational speeds is commonly referred to as a turbo lag. Accordingly, the supercharging of the flow of fresh air through the turbocharger starts with a delay when the throttle is suddenly opened since it is only once there is a sufficient flow of exhaust gas that it can begin. It has been possible in the past to compensate for this property to a certain extent by means of corresponding control systems and by using relatively small turbochargers. Within the scope of a new design approach using the 42 V vehicle on-board electrical system which is currently in planning it would also be possible to provide combined supercharging by means of an exhaust-gas turbocharger and an electric drive. This would additionally change the response behavior in a positive way. However, this approach requires relatively precise knowledge of a current rotational speed of a turbocharger for control in real time. As a result, future control tasks will also only be able to be performed using monitoring of the exhaust-gas turbocharger, which monitoring process supplies a rotational speed of the turbocharger as an output signal.

SUMMARY OF THE INVENTION

An object of the present invention is therefore to provide an inexpensive and reliably operating method as a well as a corresponding device for monitoring an exhaust-gas turbocharger.

This object is achieved by means of the features of the independent claims. Advantageous developments are the subject matter of the respect subclaims.

According to one embodiment of the invention, a device for monitoring an exhaust gas turbocharger is defined by the fact that it comprises a sound transducer which is designed to record a rotational-speed-dependent turbocharger operating noise and which is connected to an electronic system for frequency analysis for the output of a turbocharger rotational speed signal. The invention is consequently based on the recognition that at operating rotational speeds of 200,000 up to approximately 400,000 revolutions per minute, any turbocharger which is equipped with up to 17 turbine blades emits a very high-frequency operating noise in its normal operating rotational-speed range. This operating noise is therefore also referred to colloquially as turbocharger whistling. A respective current turbocharger rotational speed can be determined from one or more dominant frequencies within a sound spectrum which is emitted by a turbocharger. This occurs, for example, in an electronic system for frequency analysis, which then outputs a turbo-charger rotational speed signal.

A noise level of a turbocharger which is in the normal operating mode compared to other ambient noises within a motor vehicle is comparatively high. Since the sound which is produced at the turbocharger propagates over large distances, in particular in the intake section, without significant damping, it is advantageous that the sound transducer which is to be provided according to the invention does not itself have to be mounted directly on the turbocharger. As a result, a corresponding sound transducer is also not subject to the known high temperatures and pressures in the region of the turbocharger. As a result, according to the invention even fewer robust and therefore relatively inexpensive sound transducers with a relatively small operating temperature range etc. can be used.

In one particularly preferred embodiment of the invention, an ultrasonic transducer is used as the sound transducer. It has been found that the frequencies of a sound spectrum which are emitted by a turbocharger are above the human hearing threshold of approximately 16 kHz, i.e. in the ultrasonic range starting from approximately 20 kHz, from which a respective current turbocharger rotational speed can be determined.

An electronic system which is arranged downstream of the sound transducer comprises a frequency analysis unit. This frequency analysis unit preferably identifies a frequency band of a turbocharger operating noise on the basis of a fast Fourier transformation or FFT with subsequent bandpass filtering, and determines therefrom a respective current turbocharger rotational speed.

In one particularly preferred embodiment of the present invention, a means for determining the rotational speed of a turbocharger on the basis of an evaluation of sound is arranged together with an air mass flow rate sensor in the intake section of an internal combustion engine. An air mass flow rate sensor can operate as a mass flow sensor according to a thermal principle, wherein outputting of thermal power of a heated sensor measuring wire compared to a thermally insulated sensor wire of identical design is evaluated by means of a resistance bridge circuit as a measure of a respective flow rate. An alternative approach which saves electrical energy has been generally described in the paper "Durchflussmesstechnik—Eine Übersicht" [flow rate measuring technology—an overview] in the technical journal "Technisches Messen tm" [technical measurement tm], 1979, issue 4, pages 145-149. In this respect it is known to use a transmitting and a receiving ultrasonic measuring head for measuring flow rates. One of the two ultrasonic measuring heads in this context serves as a transmitter and one as a receiver, and they require a transceiver device. Taking this as a basis, for example EP 0 535 364 A1 has disclosed a method for high-resolution flow rate measurement by means of ultrasonic sound, in which method as ultrasonic transmitter and an ultrasonic receiver pass sound pulses through a measuring tube at an oblique altitude angle in order to determine a phase difference which is dependent on a current flow rate. In order to measure the air mass flow rate, two ultrasonic transducers have therefore already been used in the intake section, and this arrangement is supplemented in an exemplary embodiment of the invention by adding a third ultrasonic transducer, wherein this third ultrasonic transducer is specifically matched in terms of its operating frequency to the anticipated frequencies of the turbocharger which is operating mode. Alternatively to this, a device with only two ultrasonic transducers can also be provided, wherein the receiving ultrasonic transducer is then embodied with such a bandwidth that air mass flow rate measurement is carried out at a significantly higher frequency than the measurement of the rotational speed of the turbocharger. Bandpass filtering divides the output signal of the receiving ultrasonic transducer in order to feed the signal components in a respectively selective fashion to means for measuring the air mass flow rate and means for determining the rotational speed in separate circuits downstream.

BRIEF DESCRIPTION OF THE DRAWINGS

Further features and advantages of the invention will be given below with the description of two exemplary embodiments and with reference to the figures in the drawings, in which.

For the various embodiments and figures, the same reference numerals and reference designations have been used on a standard basis for identical function groups, assemblies and method steps.

DETAILED DESCRIPTION OF THE PRESENTLY PREFERRED EMBODIMENTS

Figure 1:
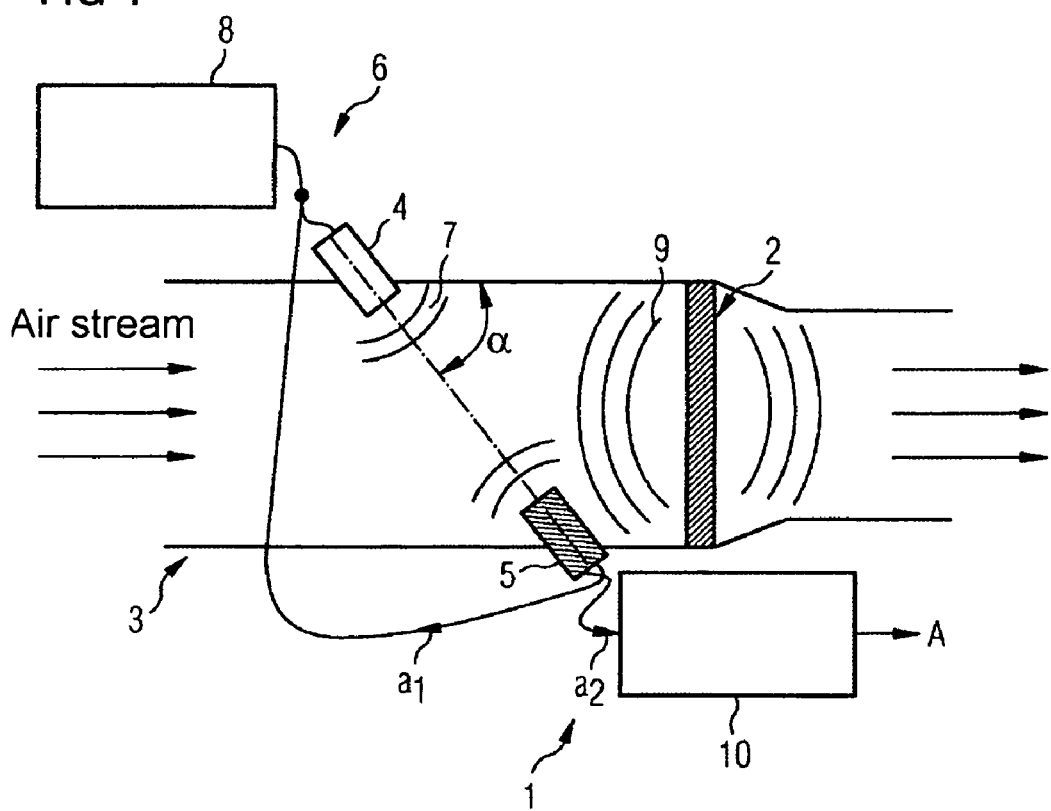
FIG. 1 is a block diagram of a device for measuring a rotational speed of a turbocharger using two standard ultrasonic transducers of an ultrasonic air mass flow rate sensor.

FIG. 1 shows a simplified block diagram of a device 1 for measuring the rotational speed of an exhaust-gas turbocharger 2 which is represented only symbolically. This device 1 is arranged in an air inlet duct 3 of an internal combustion engine (not illustrated in more detail), and operates by using two standardized sound transducers 4, 5 of an ultrasonic air mass flow rate sensor 6.

In the present exemplary embodiment, the ultrasonic air mass flow rate sensor 6 operates according to a method which has been published in EP 0 535 364 A1 and which has the purpose of determining an air mass flow rate at high flow rates. For this purpose, sound waves 7 are emitted in the ultrasonic range by the first transducer 4 with actuation by means of an electronic system 8. Said sound waves pass through the air inlet duct 3, through which a strong flow of air passes, on a path which is inclined at an angle α to the cross-sectional plane of the air inlet duct 3 in order to make the distance longer and therefore improve the measuring precision. On the opposite side of the air inlet duct 3, the sound waves 7 impinge on the second sound transducer 5 which, as an ultrasonic detector, converts the received sound waves 7 into an electrical output signal $a_1$. This electrical signal $a_1$ is fed back to the electronic system 8 for the measurement of the air mass flow rate. For the execution of the method in detail, reference is made to the entire teaching of EP 0 535 364 A1 with respect to the evaluation of the measurement results and the associated methods.

The receiving sound transducer 5 is embodied with a very large bandwidth in the ultrasonic range. As a result, the sound transducer 5 can detect and convert not only the sound waves 7, emitted by the sound transducer 4, but also the sound waves 9 which have a significantly lower frequency and are nevertheless in the ultrasonic range, wherein these sound waves 9 are generated by the operation of the turbocharger 2, and in terms of their frequency they are characteristic of a respective current rotational speed of a turbocharger. Accordingly, a respective measurement result of the second sound transducer 5 is subsequently converted doubly, as is also indicated in the drawing—an output signal of the receiving sound transducer 5 is divided into a relatively high frequency component $a_1$ and a relatively low frequency component $a_2$. These components $a_1$, $a_2$ are fed to separate units for further electrical processing. On the one hand, a significantly higher frequency component is therefore passed on to the electronic evaluation system 8 for determining an air mass flow rate, said component having been emitted at a predetermined frequency by the first transducer 4. A comparatively low frequency ultrasonic frequency component which originates from the turbocharger 2 is passed on in the signal component $a_2$ for frequency analysis to an electronic system 10. From the recorded frequency spectrum, a current rotational speed of the turbocharger is determined by suitable filter methods and mathematical algorithms, wherein, in the present case, a fast Fourier transformation for determining a characteristic frequency of the turbocharger rotational speed is applied to a bandpass filtering. The electronic system 10 which is arranged downstream of the sound transducer 5 consequently comprises a frequency analysis unit for identifying a frequency band of the operating noise of a turbocharger and for determining a respective current rotational speed of a turbocharger as an output signal A on this basis.

Figure 2:
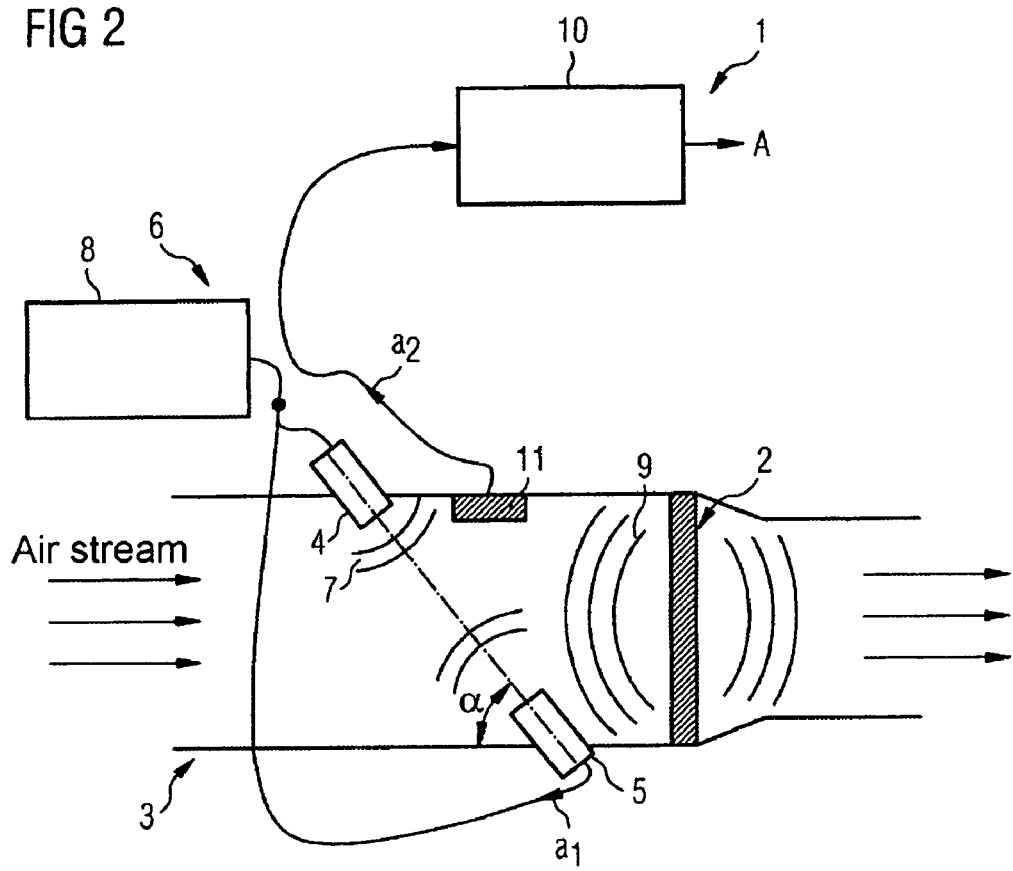
FIG. 2 is block diagram of a further embodiment for measuring the rotational speed of a turbocharger, and of an ultrasonic air mass flow rate sensor when an additional ultrasonic transducer with a downstream evaluation electronic system is used, as a block diagram in an illustration which is analogous to that in FIG. 1.

FIG. 2 shows a block diagram of a further embodiment for measuring the rotational speed of a turbocharger, and of an ultrasonic air mass flow rate sensor. This device operates by using an additional ultrasonic transducer 11 with a downstream electronic evaluation system and is represented as a block diagram in an illustration which is analogous to that in FIG. 1. In the embodiment in FIG. 2, the sound transducer 11 which is designed to record a rotational-speed-dependent turbocharger operating noise is provided as a separate component in the air inlet duct 3. The ultrasonic transducer is also based on a piezo-electric material here. However, compared to the sound transducer 5 in the exemplary embodiment according to FIG. 1, this sound transducer 11 is matched in its operating frequency with a comparatively narrow bandwidth to the anticipated frequencies which are caused by the respective operating rotational speeds of the turbocharger 2. In order to estimate a possible frequency range, it is possible to assume rotational speeds of less than 100,000 up to approximately 450,000 revolutions per minute and more than 5 to 17 turboblades. As a result, approximately frequencies of the fundamental modes from 8 kHz to more than 113 kHz and satisfactorily measurable harmonics, for example at the third harmonic or triple frequency of 24 kHz to 0.35 MHz can be anticipated. Since a nominal rotational speed range and the number of turboblades are already design variables of any turbocharger, it is possible, depending on the application, to select a more or less narrow bandwidth range for the operating frequency of the sound transducer 5 in said lower ultrasonic range.

However, compared to FIG. 2, this results in overall simpler evaluation of the electrical measurement signals compared to the first embodiment given a certain degree of additional expenditure on apparatus by providing a further separate sound transducer 11 in the air inlet duct 3, since, in particular, it is not necessary to provide for the frequencies and for an output signal to be divided into two components $a_1$, $a_2$. Furthermore, the two ultrasonic transducers 3, 4 for the measuring of the air mass flow rate have an operating frequency which is significantly above the operating frequency, and therefore also a center frequency, of the ultrasonic transducer 11 which is provided for measuring the rotational speed of the turbocharger.

Since the noise level of the turbocharger 2 is very high compared to the respective ambient noise, and is, in particular, relatively dominant in the ultrasonic range, and in addition the sound which is produced propagates over large distances in the intake section 3 without significant damping, the ultrasonic air mass flow rate sensor 6 with its sound transducers 4, 5 and the separate sound transducer 11 provided in the second embodiment does not have to be mounted directly on the turbocharger 3. As a result, means for sensing the rotational speed of a turbocharger can also be installed at any position at which, according to the conventional design, known air mass flow rate sensors are installed. In this context, the ultrasonic sensors 4, 5, 11 generally have the advantage that, for example in designs of quartz transducers, they are comparatively insensitive to temperature, dirt and pressure. In addition, such sensors can be manufactured significantly more cost-effectively or can be obtained as standard components, as will be the case with a known design of a sensor for the rotational speed of a turbocharger, the need for which is now to be avoided.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for monitoring an exhaust-gas turbocharger of an internal combustion engine, the device comprising:
   at least one sound transducer adapted to receive a rotational-speed-dependent turbocharger operating noise and output a signal; and
   an electronic system coupled to the at least one transducer for frequency analysis of a high frequency ultrasonic component and a low frequency ultrasonic component of the signal, the electronic system adapted to output a turbocharger rotational speed signal, based at least in part on the low frequency component of the signal,
   wherein the high frequency ultrasonic component is significantly higher than the low frequency ultrasonic component.

2. The device according to claim 1, wherein the at least one sound transducer is arranged in an air inlet duct of the internal combustion engine.

3. The device according to claim 1, wherein the at least one sound transducer is an ultrasonic transducer.

4. The device according to claim 3, wherein the electronic system comprises a frequency analysis unit for identifying a frequency band of the turbocharger operating noise and determining a respective current turbocharger rotational speed based at least in part on a turbocharger operating frequency of the turbocharger operating noise.

5. The device according to claim 3, wherein the at least one sound transducer is matched to frequency band of the turbocharger operating noise.

6. The device according to claim 3, further comprising means for dividing the output signal of the at least one sound transducer into a relatively high frequency component and a relatively low frequency component.

7. A method for monitoring an exhaust-gas turbocharger of an internal combustion engine, the method comprising:
receiving a rotational-speed-dependent operating noise of the turbocharger by at least one sound transducer;
outputting a signal of the at least one sound transducer based at least in part on the rotational-speed-dependent operating noise of the turbocharger; and
dividing the output signal of the at least one sound transducer into a relatively high frequency ultrasonic component and a relatively low frequency ultrasonic component;
providing the high frequency ultrasonic component and the low frequency ultrasonic component to separate units for electrical processing; and
evaluating the relatively low output signal of the at least one sound transducer in an electronic system to determine a turbocharger rotational speed,
wherein the high frequency ultrasonic component is significantly higher than the low frequency ultrasonic component.

8. The method according to claim 7, wherein the at least one sound transducer is used as a component of an air mass flow rate sensor.

9. A device for monitoring an exhaust-gas turbocharger of an internal combustion engine, the device comprising:
a first sound transducer adapted to generate sound wave;
at least one second transducer adapted to receive a rotational-speed-dependent turbocharger operating noise and the generated sound wave dependent on an air mass flow rate and to output a signal; and
an electronic system coupled to the at least one second transducer for analysis of the signal, the electronic system adapted to output a turbocharger rotational speed signal and the air mass flow rate.

10. The device according to claim 9, further comprising:
a divider for dividing an output signal of the second transducer into a relatively high frequency component and a relatively low frequency component.

11. The device according to claim 9, wherein the electronic system further comprising:
a first means for processing the relatively high frequency component of the output signal representing the air mass flow rate; and
a second means for processing the relatively low frequency component of the output signal representing the rotational-speed-dependent turbocharger operating noise.

* * * * *